(12) United States Patent
Pathak (10) Patent No.: US 9,430,618 B2
(45) Date of Patent: Aug. 30, 2016

(54) MESSAGING ADMINISTRATION BASED ON DIGITAL RIGHTS MANAGEMENT SERVICES

(71) Applicant: KONICA MINOLTA LABORATORY U.S.A., INC., San Mateo, CA (US)

(72) Inventor: Rabindra Pathak, San Jose, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 165 days.

(21) Appl. No.: 14/040,071

(22) Filed: Sep. 27, 2013

(65) Prior Publication Data

US 2015/0095376 A1 Apr. 2, 2015

(51) Int. Cl.
*G06F 17/30* (2006.01)
*G06F 21/10* (2013.01)

(52) U.S. Cl.
CPC ................................ *G06F 21/10* (2013.01)

(58) Field of Classification Search
CPC ............................................. G06F 17/30867
USPC ................................................ 707/784, 799
See application file for complete search history.

(56) References Cited

U.S. PATENT DOCUMENTS

| 9,032,289 | B1 * | 5/2015 | Cierniak et al. ... | G06F 17/30882 715/230 |
| 2002/0156796 | A1 * | 10/2002 | Hisamatsu et al. ... | G06F 3/1206 707/707 |
| 2004/0143794 | A1 * | 7/2004 | Sugimoto et al. .... | G06F 17/211 715/251 |
| 2006/0053119 | A1 * | 3/2006 | Aden et al. ............ | G06Q 10/10 707/707 |
| 2006/0187478 | A1 * | 8/2006 | Kongtcheu et al. .. | G06F 3/1206 358/1.13 |
| 2008/0273213 | A1 * | 11/2008 | Steinhart et al. ..... | G06F 3/1205 358/1.9 |
| 2013/0018960 | A1 * | 1/2013 | Knysz et al. ......... | H04L 65/403 709/204 |
| 2013/0138744 | A1 * | 5/2013 | Rajamanthiram et al. ...................... | H04L 51/08 709/206 |
| 2014/0282078 | A1 * | 9/2014 | Taylor et al. .......... | G06F 17/24 715/751 |

OTHER PUBLICATIONS

Adobe Systems Incorporated, "Adobe LiveCycle ES3 Overview: Rights Management", http://help.adobe.com/en_US/livecycle/10.0/Overview/WS92d06802c76abadb2c8525912ddcb9aad9-7ff8.html, 7 pages, printed from the internet on Apr. 15, 2014.
Adobe Systems Incorporated, "Programmatically applying policies", http://help.adobe.com/en_US/livecycle/10.0/Overview/WSb96e41f8a4ca47a9-4882aeb5131190eddba-8000.html, 1 pages, printed from the internet on Apr. 9, 2014.
Adobe Systems Incorporated, "LiveCycle® ES Java™ API Reference", http://livedocs.adobe.com/livecycle/es/sdkHelp/programmer/javadoc/index.html, 3 pages, printed from the internet on Apr. 9, 2014.

* cited by examiner

*Primary Examiner* — Robert Beausoliel, Jr.
*Assistant Examiner* — Alexandria Bromell
(74) *Attorney, Agent, or Firm* — Chen Yoshimura LLP (57) ABSTRACT

A method for servicing messages with digital documents accessed and displayed by a client application, including the steps of establishing a database of message queues each associated with one or more digital documents and containing one or more messages, and upon authorizing a user's request for accessing and using a digital document, providing a message queue associated with the digital document.

22 Claims, 6 Drawing Sheets

MESSAGING ADMINISTRATION BASED ON DIGITAL RIGHTS MANAGEMENT SERVICES

BACKGROUND OF THE INVENTION

1. Field of the Invention

This invention relates to a method of managing messages associated with digital documents, and in particular, it relates to a method for managing messages based on rights management services for digital documents.

2. Description of Related Art

Many documents are now prepared, produced, assembled and disseminated in electronic digital file formats such as the Portable Document Format (PDF). For example, traditional hard-copy publications may be replaced by one or more PDF documents, which can be opened and displayed by PDF file reader applications such as Adobe's Acrobat Reader.

Likewise traditional multi-media messages such as texts, graphics, images, sound clips or video clips may be replaced by digital tags, metadata or files, which can also be handled by their corresponding reader/player/viewer applications that would allow a user to read, view or listen to such multi-media messages.

In addition, many document provider, publisher or printer services are now implementing or engaging rights management service (RMS) to manage access and use of digital right management (DRM) protected electronic documents.

For example, when a customer or user purchases a PDF document, the customer's identification and rights to open, read or copy/reproduce the pack document can be handled by an RMS which will allow the customer to access and use the document with the rights assigned to the customer (e.g., open and read the document), while restricting unauthorized uses by the customer (e.g., print and copy).

After a customer obtains a digital document, he or she can open the digital document by using a corresponding client program. For example, if the digital document is a PDF file, then the client program may be a PDF reader. Typically, the client program will check to see whether the file is DRM-protected. If the file is DRM-protected, then the client program will ask the customer to provide a user identification (ID) and password, and check the user ID with an RMS system by accessing an RMS server via a computer network such as the Internet. The RMS system then verifies the user ID with a database maintained at the server to determine the customer's rights in connection with the digital document, and inform the client program what rights are granted to the customer with regard to the digital document.

SUMMARY

The above mentioned DRM authorization process provides a good opportunity to serve the customers with additional information or messages beyond just granting them the access to the digital documents. For example, a message reminding completion deadline of academic course-pack can be displayed along with the course-pack document. Or a message serving advertisement of travel accommodations can be displayed along with the tourist guide document. Unfortunately, current DRM and RMS systems do not enable this capability.

Therefore, the present invention is directed to a new method of messaging administration based on DRM services.

An object of the present invention is to provide a new method for managing digital multi-media messages based on DRM services offered by RMS providers.

The objectives and other advantages of the invention will be realized and attained by the structure particularly pointed out in the written description and claims thereof as well as the appended drawings.

To achieve these and/or other objects, as embodied and broadly described, one of the exemplary embodiments of the present invention provides a method for servicing messages with digital documents accessed and displayed by a client application, including the steps of establishing a database of message queues each associated with one or more digital documents and containing one or more messages; and upon authorizing a user's request for accessing and using a digital document, providing a message queue associated with the digital document.

In a further aspect, another one of the exemplary embodiments of the present invention provides a computer software program product that causes one or more data processing apparatus to perform the above described methods. The computer program product includes at least one computer usable non-transitory medium (e.g. a memory or storage device) having computer readable codes embedded therein for controlling the one or more data processing apparatus, the computer readable codes configured to cause the one or more data processing apparatus to execute the above described processes.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide a method for messaging administration based on DRM services. RMS systems have been utilized to protect digital document files, so that only authorized users can access and use the files. With the addition of messaging services, customers are provided with additional information that may be associated with or related to the corresponding document files. By providing messaging services at the same time the DRM authorization is provided to the document files, the effectiveness and efficiency of the messaging services can be improved.

Particularly, the embodiments of the present invention provide a mechanism to utilize RMS or Learning Management Services (LMS) systems for managing the messages, associating messages with their corresponding document files, and also managing the access and use of the messages.

Figure 1:
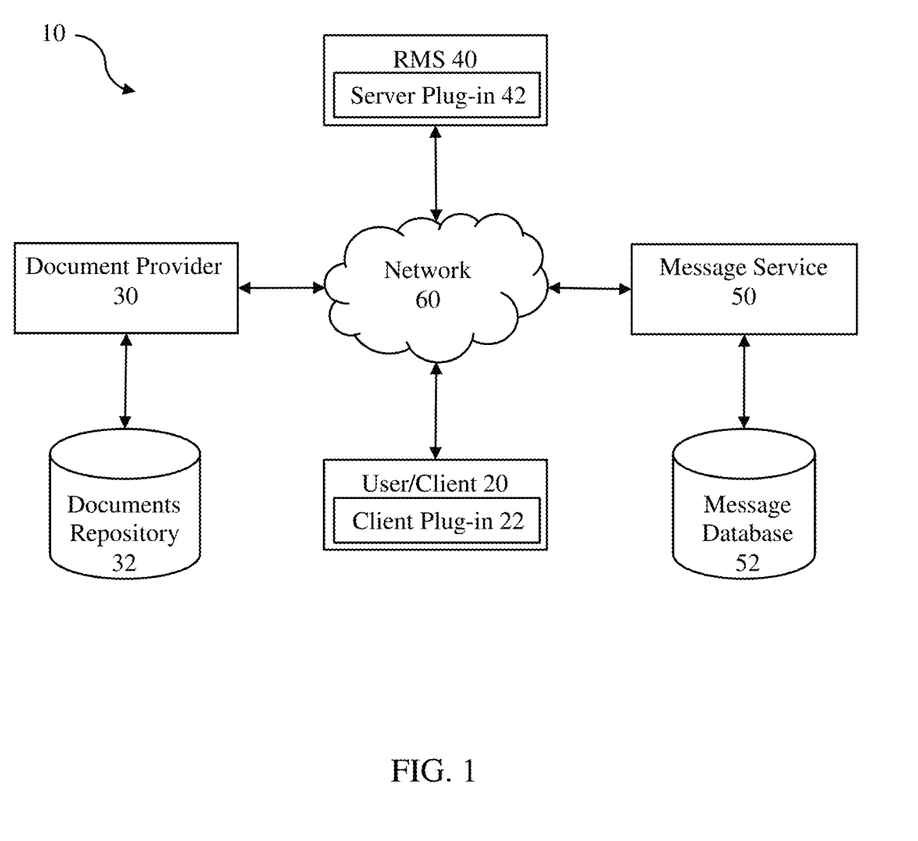
FIG. 1 is a schematic block diagram illustrating an exemplary online environment according to one of the embodiments of the present invention.

Referring to FIG. 1, there is shown a schematic block diagram illustrating an exemplary arrangement 10 in which various embodiments of the present invention may be implemented. The exemplary environment 10 includes a user terminal or a client program running on a user's terminal 20, a document provider server 30 connected to an electronic document repository 32, an RMS server 40, and a messaging service server 50 connected to a document ID and message database 52, all connected through a network 60 which may include a computer network such as the Internet or other communication links.

A user may use a user computer or terminal 20, or similar suitable devices such as a laptop computer, a tablet computer, an e-reader, or a smart phone, etc., to gain online access to the computer network 60 and interact with the document provider server 30, the RMS server 40 and the messaging service server 50, etc. For example, a user may purchase and download a PDF document the document provider server 30. When a user tries to open the PDF document from the user's computer 20 by using a client program such as a PDF file reader, the client program will contact the RMS server 40 to obtain authorization for the user, and then displays the content of the PDF document on the user's computer 20. When the RMS server 40 provides authorization to the user, messages associated with the PDF documents may also be accessed by the user's computer 20. This is handled by a client module 22 which can be a plug-in to the client program installed on the user's computer 20.

The document provider server 30 may be operated by, for example, a document publisher/printer, a bookseller, an educational institution, an LMS provider, etc., which generally provides online electronic documents, books, booklets, publications and other materials in digital files. The document provider server 30 may provide an integrated online service platform such as an online web-store that allows users to search, access, upload or download, and purchase electronic documents stored as digital files in its internal storage device and/or in the document repository 32.

The RMS server 40 may be operated by a DRM center, a copyrights management center or other commercial establishments. The document provider server 30 and the RMS server 40 may be the same server or operated by a same entity. When an electronic document is purchased by a user in a digital file, the RMS server 40 may enable appropriate DRM protection to the document such that only the user who has purchased the document may have appropriate rights to access and view the document.

The messaging service server 50 may be operated by a messaging service provider, an advertising agency or other commercial establishments. The messaging service server 50 provides and manages messages that are stored in a message database 52 and associated with appropriate or corresponding documents.

Details of the interactions of the various parties shown in FIG. 1 will be described in conjunction with the following disclosures and descriptions.

Figure 2:
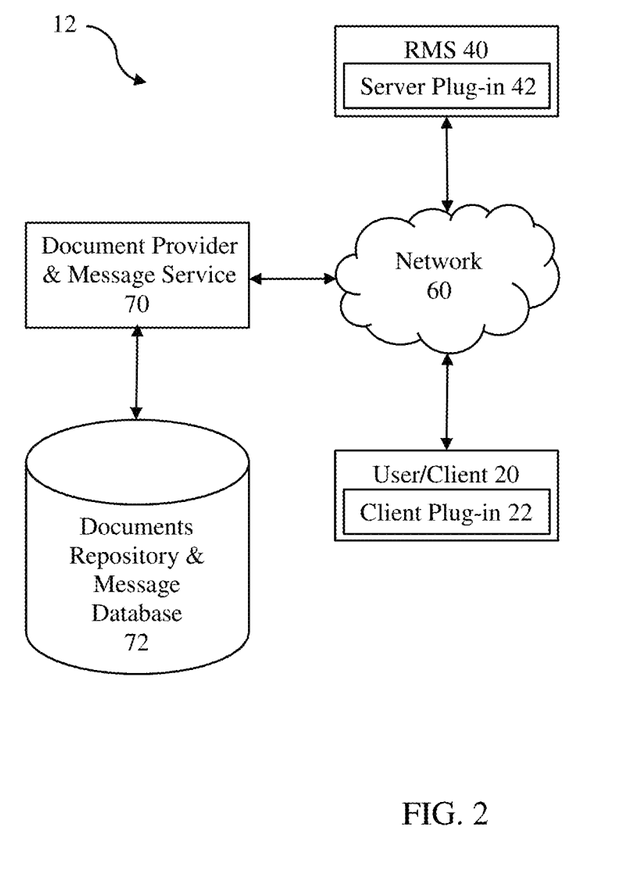
FIG. 2 is a schematic block diagram illustrating another exemplary online environment according to one of the embodiments of the present invention.

As shown in FIG. 2, in an alternative arrangement 12, the document provider server 30 and the messaging servicer server 40 may be the same server 70 operated by a same entity such as a document publisher/printer, an educational institute or a commercial establishment. In this alternative arrangement the document repository and the message database may be maintained on a same memory or data storage device 72.

The computers, terminals and servers shown in FIGS. 1 and 2 may be computers, server computers, or computer or server systems, including webservers, where the computer software programs, applications or plug-in modules implementing the various processes of the exemplary embodiments of the present invention may be installed and executed. These programs, applications or plug-ins also provide appropriate user interfaces (US) or graphic user interfaces (GUI) to allow users and administrators/operators to interact with the computer/servers to perform various steps of the process.

The physical locations or the commercial relationship among the various parts of the environment shown in FIGS. 1 and 2 are not important. For example, the document provider server 30 and/or the RMS server 40 may be located in a publishing house, a printing service provider, an educational institution, an organization or a commercial establishment.

In this application, the term "server" generally refers to any computer, server, server computer, server instance, computer or server system, data processor, controller, data processing unit or apparatus, or any suitable system, apparatus or device, and any computer software program or application that are installed or executed on such system, apparatus or device, that may be used to implement the methods or carry out the processes provided by the embodiments of the present invention. However, in this application the term "client" specifically refers to a computer software program or application that is used by a user to open, display/read or otherwise use (such as print and copy) an electronic document. For example, for PDF documents, the client may be a PDF reader such as Adobe®s Acrobat Reader. However, it is understood that this invention covers other document or file types as well, such as Microsoft® Word, Excel, PowerPoint (PPT), etc., so the client may be any program that display/read or otherwise use these various types of documents or files.

As mentioned earlier, in one aspect, an exemplary embodiment of the present invention is embodied a computer program product that causes a data processing apparatus to perform the exemplary embodiments of the methods of the present invention. The computer program product includes a computer usable non-transitory medium (e.g. memory or storage device) having a computer readable program code embedded therein for controlling a data processing apparatus, where the computer readable program code is configured to cause the data processing apparatus to execute the process of the present invention described herein.

Figure 3:
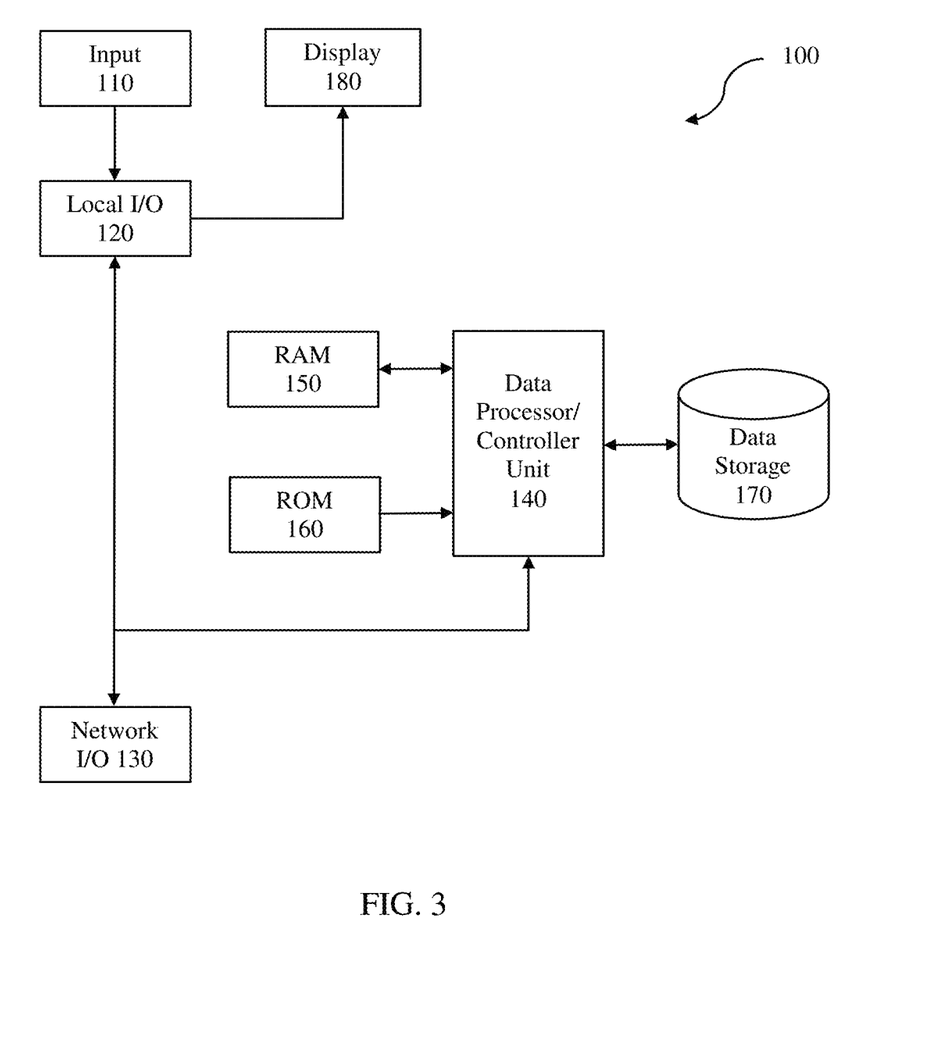
FIG. 3 is a schematic block diagram illustrating an exemplary data processing apparatus such as a computer or server having a data processing unit according to one of the embodiments of the present invention.

Referring to FIG. 3, there is shown a schematic block diagram illustrating an exemplary server 100, whereupon various embodiments of the present invention may be implemented. The server 100 typically includes a user input device 110 including, for example, a keyboard and a mouse. The input device 110 may be connected to the server 100 through a local input/output (I/O) port 120 to enable an operator and/or user to interact with the server 110. The local I/O 120 is also provided for local connections via direct links to other electronic devices such as a file storage, a monitor and/or a printer. The server 100 typically also has a network I/O port 130 for connection to a computer network such as the Internet, so that the server 100 may remotely communicate with the other servers connected to the computer network.

The server 100 typically has a data processor/controller unit 140 such as a central processor unit (CPU) that controls the functions and operations of the server 100. The data processor/controller unit 140 is connected to various memory devices such as a random access memory (RAM) device 150, a read only memory (ROM) device 160, and a storage device 170 such as a hard disc drive or solid state memory. The storage device 170 may be an internal memory device or an external memory device such as a file storage device.

The computer software program codes and instructions for implementing the various embodiments of the present invention may be installed or saved on one or more of these memory devices such as the ROM 160 or storage device 170. When executed, certain computer program codes and/or instructions may be read out from the ROM 160 or storage device 170 and temporarily stored in the RAM 150 for execution by the data processor/controller unit 140, which executes these computer programs codes and/or instructions to perform the functions and carry out the operations to implement the process steps of the various embodiments of the present invention.

The server 100 typically also includes a display device 180 such as a video monitor or display screen which may be connected to the local I/O 120. The input device 110 and the display device 180 together provide a user interface which allows a user to interact with the server 100 to perform the steps of the process according to the various embodiments of the present invention. The input device 110 and the display device 180 may be integrated into one unit, such as a touch screen display unit, to provide a more easy and convenient UI for user interaction with the server 100.

It is understood that the server 100 may be any suitable computer or computer system. Preferably for use, for example, by a document provider, an RMS system or a messaging service provider, the server 100 is a commercial server. However, for use by a member of the general public, the server 100 may be a desktop computer, a laptop computer, a notebook computer, a netbook computer, a tablet computer, a hand-held portable computer or electronic device, a smart phone, or any suitable data processing apparatus that has suitable data processing capabilities.

Figure 4:
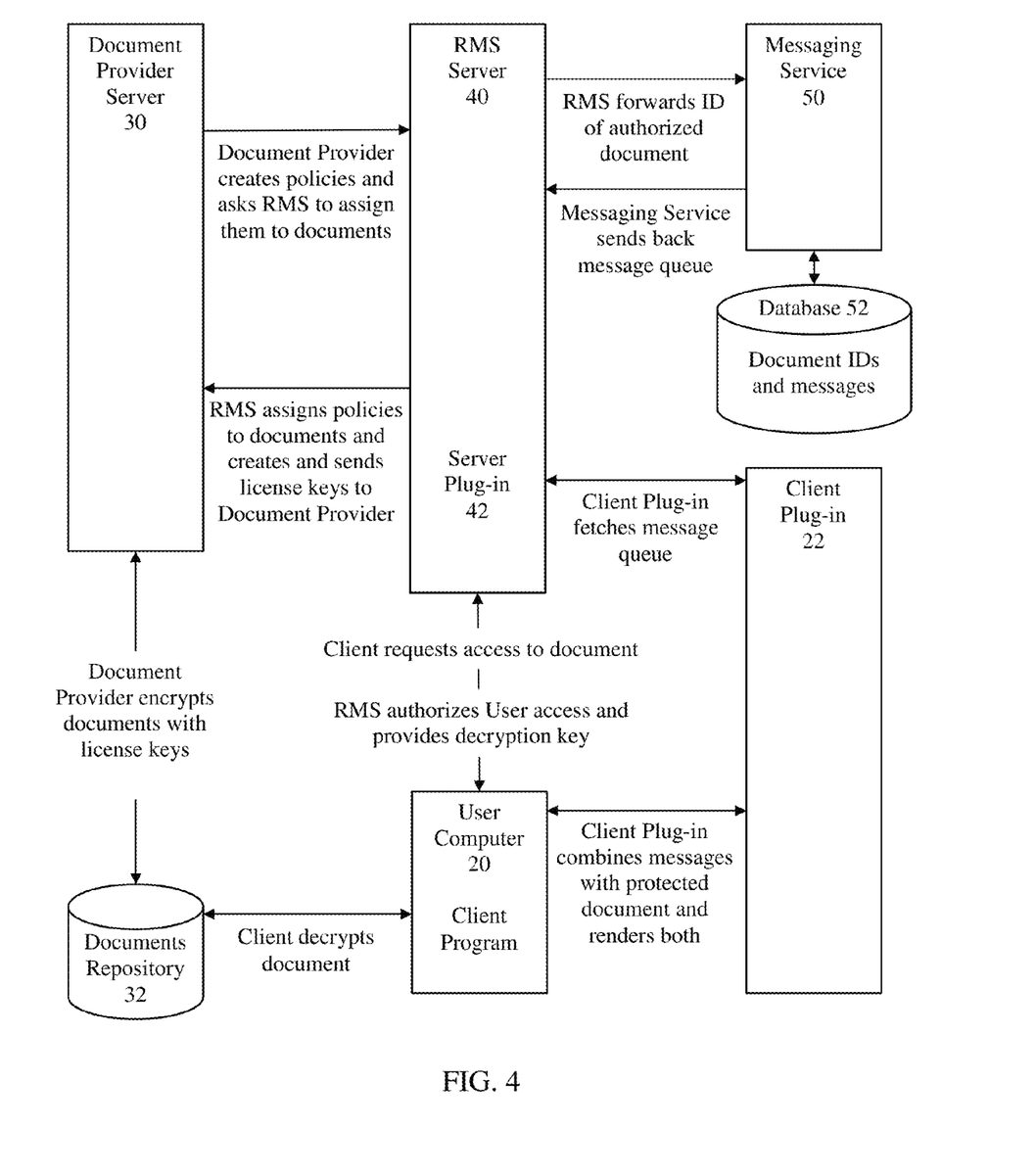
FIG. 4 is a schematic block diagram illustrating one of the exemplary embodiments of the present invention.

Referring to FIG. 4, there is shown a block diagram illustrating an exemplary process in accordance with to one of the embodiments of the present invention. The description herein of the structures, functions, interfaces and other relevant features, such as digital rights policies, application programming interface (API) for rights management and policies, etc., of existing DRM method and systems may at times incorporates, references or otherwise uses certain information, documents and materials from publicly and readily available and accessible open sources, e.g., "Rights Management" (URL http://help.adobe.com/en_US/livecycle/10.0/Overview/WS92d06802c76abadb2c8525912ddcb9aad9-7ff8.html), "Programmatically applying policies (a subsection of 'Rights Management')", (URL http://help.adobe.com/en_US/livecycle/10.0//Overview/WSb96e41f8a4ca47a9-4882aeb5131190eddba-8000.html), "LiveCycle® ES Java™ API Reference" (URL http://livedocs.adobe.com/livecycle/es/sdkHelp/programmer/javadoc/index.html), etc.

As shown in FIG. 4, the document provider server 30 generally performs the tasks of providing digital documents, and also creating user policies for accessing and using the documents. The document provider server 30 then requests the RMS server 40 to assign the user policies to the respective documents.

Upon the requests from the document provider server 30, the RMS server 40 will assign the user policies to the respective documents, and create encrypted license keys to the documents. The RMS server 40 then sends the license keys to the document provider server 30.

Upon receiving the license keys from the RMS 40, the document provider 30 will encrypt the documents with their respective license keys. The encrypted documents are saved in a document repository 32. Of course the encrypted documents may also be stored as URL addresses of interactive web pages or web services, or stored locally at the RMS server 40.

The messaging service 50 manages the messages. The messages may be a multi-media form such as texts, graphics, images, audio clip, video clips, mini-player modules, etc. For example, the messages may be actual text messages, or a message with dynamic contents which may change based on what document they will be associated with or which user they will reach. For example, for a document that is a quiz, the message may be an answer. For another example, the message may have advertising contents that will be different depending on the geographic location of the users of the document. The messages may be provided as metadata or other embedded objects through suitable means such as the Java® Script. The messages may also be placed in one or more layers of a PDF document.

The messages may be created or configured by the messaging server 50, or provided by other third party sources. The messages may be stored in the message database 52 or other suitable storage locations or devices. The messages are preferably organized in a way that is associated with the document IDs. In other words, for each document to be accessed by users, certain messages will be provided along with the documents.

These messages may be related to the contents of the document. For example, if the document is a tour guide, than the messages may be advertisement of travel accommodations. On the other hand, the messages may be totally unrelated to the contents of the documents. For example, the messages may be an announcement of a new publication. However, whether related or not to the content of a document, one or more messages will be associated with the ID of the document. As a result, for each document ID, there will be (if there is any) one or more messages associated therewith or assigned thereto. The messages associated with or assigned to each document ID form a message queue. So for the vast number of documents, there will be a vast number of message queues to be provided together with their corresponding documents. Of course the message queues may also be associated with user IDs and/or policy IDs.

A user may obtain a digital document from the document provider 30. When a user tries to open a DRM-protected document by using a client program at, e.g., the user's computer or terminal 20, the client program will establish online access to the RMS server 40 and request authorization for the user. The RMS server 40 will check the user ID, the document ID and related policies. If the authorization is granted, the RMS server 40 will send a decryption key for the document to the client program, so the client program can decrypt the document for the user. When the RMS server 40 receives the user's request for document authorization, the RMS server 40 will forward the document ID to the messaging server 50. The messaging server 50 will look up the document ID and retrieve the message queue associated with or assigned to the document ID, and send the message queue to the RMS server. A client plug-in module 22 to the client program will fetch the message queue to see whether there are indeed messages for the authorized document. If one or more messages indeed exist in the message queue, then the client plug-in 22 will combine the messages with the document and renders both. As a result, when the user reads the document from an onscreen display, the messages will be shown or played accordingly.

As mentioned earlier, this invention covers other document or file types as well, such as Microsoft® Word, Excel, PowerPoint (PPT), etc., so the client 20 may be any program that display/read or otherwise use these various types of documents or files. Likewise, it is also understood that the client plug-in 22 can handle various types of documents or files to match the client 20. In other words, this invention also covers client-plugins for various documents of file types, e.g. PDF, Word, Excel and PowerPoint, etc. There will be special client plugins for each individual document or file type like PDF, Word, Excel and PowerPoint, etc.

Figure 6A:
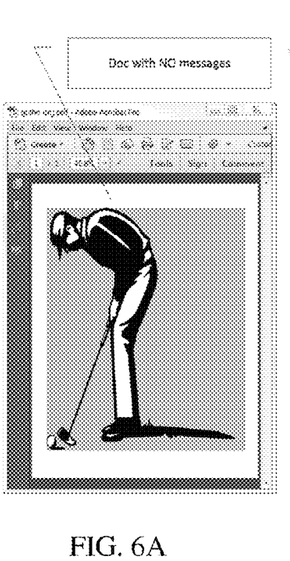
FIGS. 6A-6C are sample screen shots illustrating the dynamic arrangements of the embedded objects of the messaging administration according to the exemplary embodiments of the present invention.
Figure 6B:
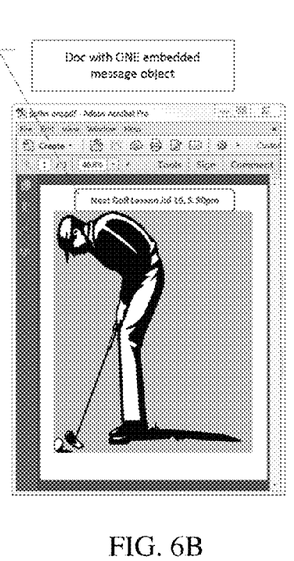
Figure 6C:
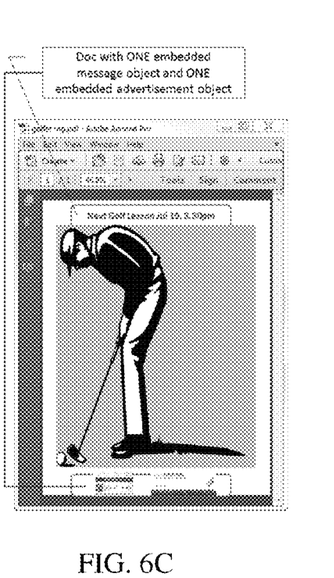

The client plugin 22 can either show all the messages in a message queue at one time or decide to show them one by one based on user actions or preferences. For example, advertisement related message may show next message from queue when a user navigates from one page to the next page or opens the document next time. Thus for each page the user may see a different advertisement. System administrator at the message server provider server who creates or assembles the message queues can specify how the client plugin 22 will display the messages, e.g., all at the same time or one at a time based on user actions. User action that will trigger the next message to be shown will be also stored for future references. This information will be stored in the message queue database Referring to FIGS. 6A-6C, there are shown sample screen shots illustrating the dynamic arrangements of the embedded objects of the messaging administration according to the exemplary embodiments of the present invention. As discussed earlier, dynamic messages are used as embedded objects in an associated document. These objects will be hidden if there is no message or if user chooses to opt out (i.e., not receiving the messages). When there are messages in the message queue, then these embedded objects will display the messages or advertisements. For example, FIG. 6A illustrates an example where a document is displayed without any message (either because there is no message or the user chooses not to receive any message), FIG. 6B illustrates another example where the document is displayed with one embedded message object, and FIG. 6C illustrates a further example where the document is displayed with one embedded text object and one embedded advertisement object.

Figure 7A:
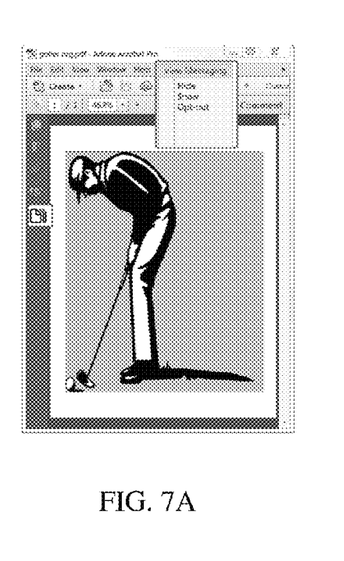
FIGS. 7A-7B are sample screen shots illustrating the message viewing options of the messaging administration according to the exemplary embodiments of the present invention.
Figure 7B:
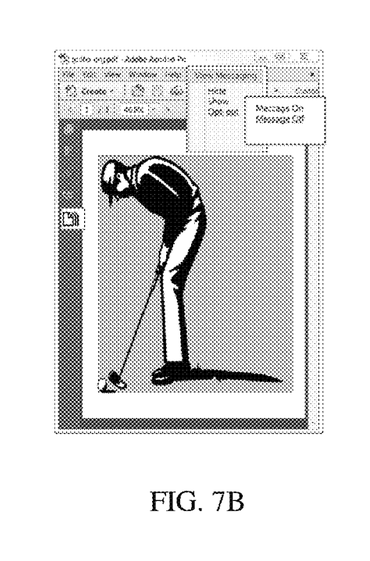

As further seen in FIGS. 7A and 7B, users may choose from the "View Messaging" menu to hide or show the messages. Users may also choose to completely opt-out of messaging service. If a user selects the "hide" option, then whenever there are additional messages, then the icon on the left side will be highlighted, indicating that there are unread messages. The user then can choose the "show" option or click on the icon on the left and the messages will be displayed. Once all the messages are read in the "hide" mode, then left side icon will be greyed out. This icon will be greyed out all the time in the "show" or "opt-out" mode.

As an alternative approach, embedded objects and their associated messages can be displayed in one or more of the layers of a multi-layer PDF document. This will provide one or more messaging and advertising layers that can be dynamically updated based on the message queue.

The RMS server 40 may also be provided with a server plug-in module 42 that works from the RMS server side with the client plug-in module 22 at the user computer side. The server plug-in 42 may also have the functions of managing and configuring the messages and establishing and organizing the message queues.

The server plug-in module 42 will be installed on RMS server 40 as an add-on module. When a user tries to open the protected document on the user's computer, the client program 20 which may be a document viewer (for example Adobe Acrobat) will send the authorization request to the client plug-in module 22. The client plug-in module 22 will send the authorization request to RMS server 40. The RMS server 40 will do the authorization and send the authorization response to the service plug-in module 42. If user is authorized, then the server plug-in module will communicate with messaging service provider server 50 and get the message queue for the document. The server lug-in module 42 will send the authorization response and message queue information to client plug-in module 22. If user is not authorized to open the document, the server plug-in module 42 will not send the message queue information to client plug-in module 22 and it will only send the authorization response.

When user request for a DRM-protected document is authorized, then server plug-in 42 will send the message queue along with authorization response to the client side. On the client side the client plug-in 22 will combine the message with the document and display them together. Message can be a static information or dynamic content enabling user interactions with the message.

These plug-in modules are software programming codes and instructions for carrying out the additional steps related to the access and use of message queues in the process of the exemplary embodiments of the present invention described herein. Server plug-in 42 22 is compatible and can work with the server applications on the RMS server 40 and utilize existing features and functionalities of the server applications, yet provide additional features and functionalities for managing and sending messages to the users. Client plug-in 22 is compatible and can work with the client program on the user compute 20 and utilize existing features and functionalities of the client program, yet provide additional features and functionalities for fetching, rendering and displaying/showing/playing the messages to the users.

Figure 5:
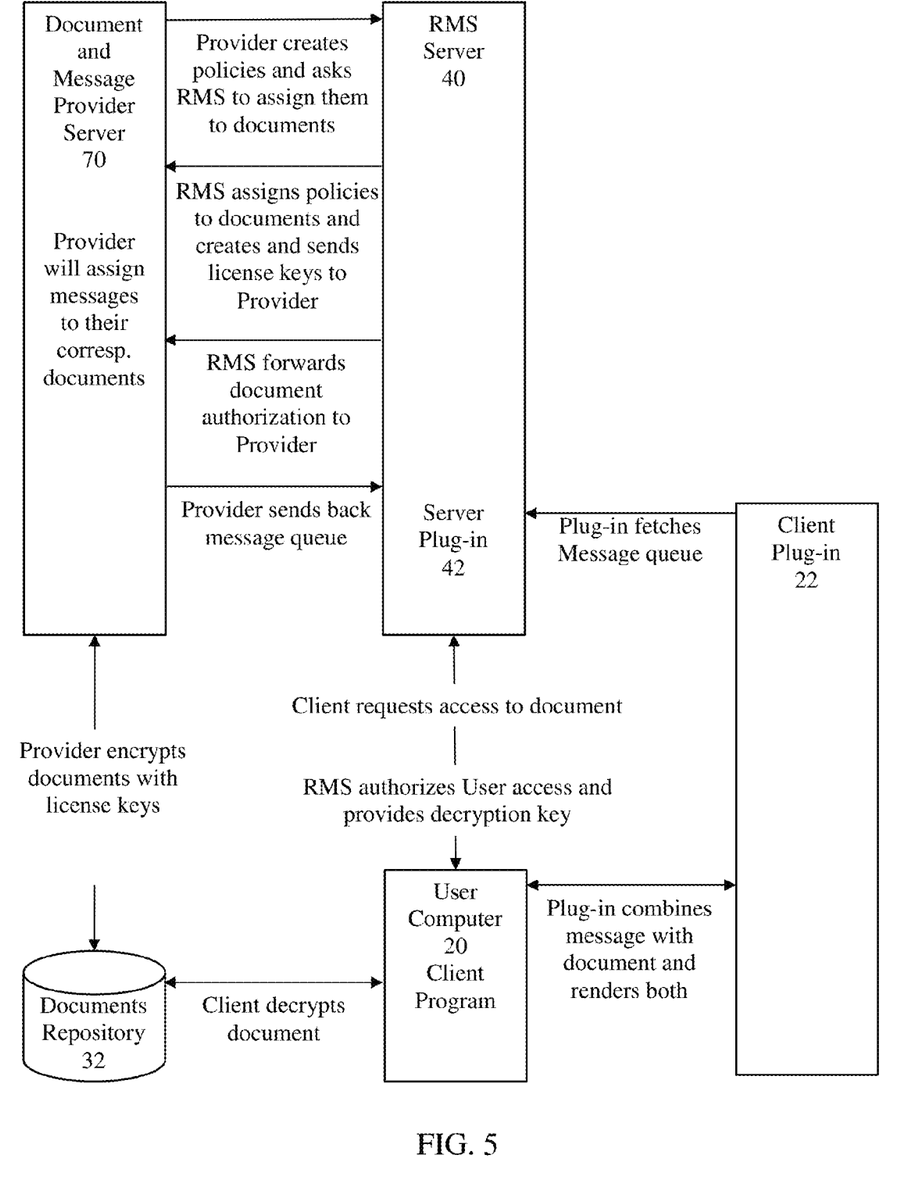
FIG. 5 is a schematic block diagram illustrating another one of the exemplary embodiments of the present invention.

As mentioned earlier in conjunction with FIG. 2, the document provider server 30 and the messaging servicer server 50 may be the same server 70 operated by a same entity. With this alternative arrangement, the tasks and steps handled by document provider server 30 and messaging service server 50 will be handled by server 70, as shown in FIG. 5.

Alternatively, the RMS server 40 may be completely replaced with the messaging server 50, and whenever a DRM-protected document is opened, the client plug-in will go and fetch the messages from the messaging server 50 and then show/display/play it along with the original document content. Of course the benefit of having a separate RMS server is that messages are completely protected from unauthorized access, just like the document is protected from unauthorized access.

The present invention method has many advantages. It combines documents with message but allows the documents and messages be obtained from different source. For example the messages may be retrieved online from a remote source while the document may be retrieved from a local hard disk of the user's computer, yet eventually both the document and the associated messages are combined and rendered together by the client plug-in.

The present invention method enables document providers to leverage messaging capability along with DRM-protection of the documents. It also allows document providers to separate messages from the actual documents. It further allows embedding objects that will be dynamically populated based on the information contained in the messages. In addition, in case of PDF documents, these messages and/or advertisements can be displayed in one of the layers of multi-layer PDF document; providing user the option to hide the messages/advertisements, and only see them when the user chooses to do so.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

It will be apparent to those skilled in the art that various modification and variations can be made in the method and related apparatus of the present invention without departing from the spirit or scope of the invention. Thus, it is intended that the present invention cover modifications and variations that come within the scope of the appended claims and their equivalents.

What is claimed is:

1. A method for servicing messages with digital documents accessed and displayed by a client application, comprising the steps of:
    establishing a database of message queues each associated with one or more digital documents and containing one or more messages; and
    upon authorizing a user's request for accessing and using a digital document, providing a message queue associated with the digital document, wherein if the digital document is a multi-layer portable document format (PDF) document, then the messages are provided in one or more of the layers of the multi-layer PDF document.

2. The method of claim 1, further comprising a step of:
    displaying the digital document along with one or more messages in the provided message queue.

3. The method of claim 2, wherein the one or more messages in the provided message queue are displayed in the digital document.

4. The method of claim 1, further comprising a step of allowing a plug-in program to the client application to fetch the message queue to retrieve any messages contained therein, wherein the plug-in program combines the retrieved messages with the digital document and renders them together for use by the user.

5. The method of claim 1, further comprising a step of configuring a message queue with one or more messages.

6. The method of claim 1, further comprising a step of associating a message queue to one or more digital documents.

7. The method of claim 1, wherein the messages are provided as metadata.

8. The method of claim 1, wherein the messages are provided as embedded multi-media objects.

9. The method of claim 1, wherein the messages are provided as dynamic contents.

10. The method of claim 1, wherein the digital document is accessed by the client program from a first source, and the messages in the message queue associated with the digital document are accessed by the plug-in program from a second source that is different from the first source.

11. A method for servicing messages with digital documents accessed and displayed by a client application, comprising the steps of:
    establishing a database of message queues each associated with one or more digital documents and containing one or more messages;
    upon authorizing a user's request for accessing and using a digital document, providing a message queue associated with the digital document; and
    allowing a plug-in program to the client application to fetch the message queue to retrieve any messages contained therein, wherein the plug-in program combines the retrieved messages with the digital document and renders them together for use by the user, wherein the plug-in program provides an option for the user to opt-out of the messaging service.

12. A computer program product comprising at least one non-transitory computer usable medium having computer readable codes embodied therein for controlling one or more data processing apparatus, the computer readable codes configured to cause the one or more data processing apparatus to execute a process for servicing messages with digital documents accessed and displayed by a client application, the process comprising the steps of:
    establishing a database of message queues each associated with one or more digital documents and containing one or more messages; and
    upon authorizing a user's request for accessing and using a digital document, providing a message queue associated with the digital document, wherein if the digital document is a multi-layer portable document format (PDF) document, then the messages are provided in one or more of the layers of the multi-layer PDF document.

13. The computer program product of claim 12, wherein the process further comprises a step of:
    displaying the digital document along with one or more messages in the provided message queue.

14. The computer program product of claim 13, wherein the one or more messages in the provided message queue are displayed in the digital document.

15. The computer program product of claim 12, wherein the process further comprises a step of allowing a plug-in program to the client application to fetch the message queue to retrieve any messages contained therein, wherein the plug-in program combines the retrieved messages with the digital document and renders them together for use by the user.

16. The computer program product of claim 12, wherein the process further comprises a step of configuring a message queue with one or more messages.

17. The computer program product of claim 12, wherein the process further comprises a step of associating a message queue to one or more digital documents.

18. The computer program product of claim 12, wherein the messages are provided as metadata.

19. The computer program product of claim 12, wherein the messages are provided as embedded multi-media objects.

20. The computer program product of claim 12, wherein the messages are provided as dynamic contents.

21. The computer program product of claim 12, wherein the digital document is accessed by the client program from a first source, and the messages in the message queue associated with the digital document are accessed by the plug-in program from a second source that is different from the first source.

22. A computer program product comprising at least one non-transitory computer usable medium having computer readable codes embodied therein for controlling one or more data processing apparatus, the computer readable codes configured to cause the one or more data processing apparatus to execute a process for servicing messages with digital documents accessed and displayed by a client application, the process comprising the steps of:

establishing a database of message queues each associated with one or more digital documents and containing one or more messages;

upon authorizing a user's request for accessing and using a digital document, providing a message queue associated with the digital document; and allowing a plug-in program to the client application to fetch the message queue to retrieve any messages contained therein, wherein the plug-in program combines the retrieved messages with the digital document and renders them together for use by the user, wherein the plug-in program provides an option for the user to opt-out of the messaging service.

\* \* \* \* \*